United States Patent [19]
Dugan et al.

[11] Patent Number: 5,427,247
[45] Date of Patent: Jun. 27, 1995

[54] METHOD FOR MOBILIZATION OF HAZARDOUS METAL IONS IN SOILS

[75] Inventors: Patrick R. Dugan, Idaho Falls, Id.; Robert M. Pfister, Powell, Ohio

[73] Assignee: Lockheed Idaho Technologies Company, Idaho Falls, Id.

[21] Appl. No.: 67,195

[22] Filed: May 25, 1993

[51] Int. Cl.$^6$ .................................................. B03B 1/00
[52] U.S. Cl. .......................................... 209/5; 209/173
[58] Field of Search .............. 209/4, 5, 173; 210/682, 210/688

[56] References Cited

U.S. PATENT DOCUMENTS

| | | | |
|---|---|---|---|
| 4,298,169 | 11/1981 | Iwasaki | 209/5 X |
| 4,530,963 | 7/1985 | DeVoe et al. | 210/688 X |
| 4,540,484 | 9/1985 | McCarthy | 209/5 |
| 4,585,559 | 4/1986 | DeVoe et al. | 210/688 X |
| 4,597,791 | 7/1986 | Siddall | 209/5 X |
| 5,242,598 | 9/1993 | Shannon et al. | 209/5 X |
| 5,262,064 | 11/1993 | El-Shall | 209/5 X |
| 5,285,972 | 2/1994 | Notebaart et al. | 209/5 X |

*Primary Examiner*—D. Glenn Dayoan
*Attorney, Agent, or Firm*—Alan D. Kirsch

[57] ABSTRACT

A microbial process for removing heavy metals such as bismuth, cadmium, lead, thorium, uranium and other transuranics from soils and sediments, utilizing indigenous, or isolates of indigenous, microorganisms and reducing agents, such as cysteine or sodium thioglycollate, or complexing agents such as the amino acid glycine, to effect the mobilization or release of the metals from the soil particles.

21 Claims, 5 Drawing Sheets

METHOD FOR MOBILIZATION OF HAZARDOUS METAL IONS IN SOILS

CONTRACTUAL ORIGIN OF THE INVENTION

The United States Government has rights in this invention pursuant to Contract No. DE-AC07-76ID01570 between the U.S. Department of Energy and EG&G Idaho, Inc.

BACKGROUND OF THE INVENTION

This invention relates to a method for the mobilization of metal ions in soils and on other surfaces and more particularly to a method using reducing agents in conjunction with indigenous microorganisms to mobilize hazardous metals bound to soils and other contaminated solid surfaces.

Among the various environmental concerns, soil and sediment remediation has received considerable attention in recent years because soils and sediments are the ultimate repositories for many metals that cycle in the environment as a result of activities such as mining, electroplating and various manufacturing and industrial processes. In most instances the metals are immobilized in place by being sorbed (physiochemically bound) to surfaces such as soil particles or contaminated equipment.

There is considerable interest in the remediation of contaminated soils and sediments by so-called soil-cleaning techniques and in the prevention of future contamination via removal of hazardous metals from processing streams prior to deposition into receiving waters. Present methods of recovery of waste waters include the use of ion-exchange resins, biosorption, chemical precipitation, electrolysis, reverse osmosis and membrane filtration. A variety of chemical technologies may be of value in the extraction of heavy metals from soils and sediments including washing with: water, salts, complexing agents such as ethylenediaminetetracetate (EDTA) or nitriolotriacetic acid (NTA), mineral acids, strong bases and some organic acids such as citric acid, that are also complexing agents. There is a need to remediate metal contaminants including, but not limited to, such metals as bismuth, cadmium, lead, thorium, uranium and other transuranic metals, by effecting their release from the bound state (i.e., mobilization) so that they can subsequently be removed and recovered. Bioremediation utilizing reducing agents and microorganisms has value for the mobilizations of contaminants because of its potential economic advantage.

It is an object of this invention to provide a process utilizing indigenous microorganisms and reducing agents to effect the mobilization of metal contaminants.

It is another object of this invention to provide a process using the amino acid cysteine, a reducing agent as well as a metal complexing agent, to enhance the microbial effectiveness for the removal of hazardous metals from soil.

Additional objects, advantages and novel features of the invention will become apparent to those skilled in the art upon examination of the following and by practice of the invention.

SUMMARY OF THE INVENTION

To achieve the foregoing and other objects, a method for mobilizing metal ions bound to soils and other surfaces is provided. In a preferred embodiment, an aqueous solution containing a reducing agent material, such as the amino acid cysteine, is contacted with the soils or other surfaces having bound thereto the metal ions. Experimental studies by Applicant have shown that cysteine is an effective agent for the microbial release of metals. Indigenous microorganism in the soil or other surfaces have been shown to be effective for the release of the metal ions. In another embodiment, the soils or other surfaces can be inoculated with microorganisms isolated from the soils or other surfaces. All metals are susceptible to the method of the present invention, particularly, without limiting, the following metals: bismuth, cadmium, lead, thorium, uranium and the other transuranic metals. Other reducing agents such as sodium thioglycollate can be used. In another embodiment, the amino acid glycine is used for the effective removal of thorium, uranyl ions and other transuranics from soil. Thorium has long been considered a difficult metal to release from soil.

BRIEF DESCRIPTION OF THE DRAWINGS

The present invention is illustrated in the accompanying drawings where.

DETAILED DESCRIPTION OF THE INVENTION

Figure 1:
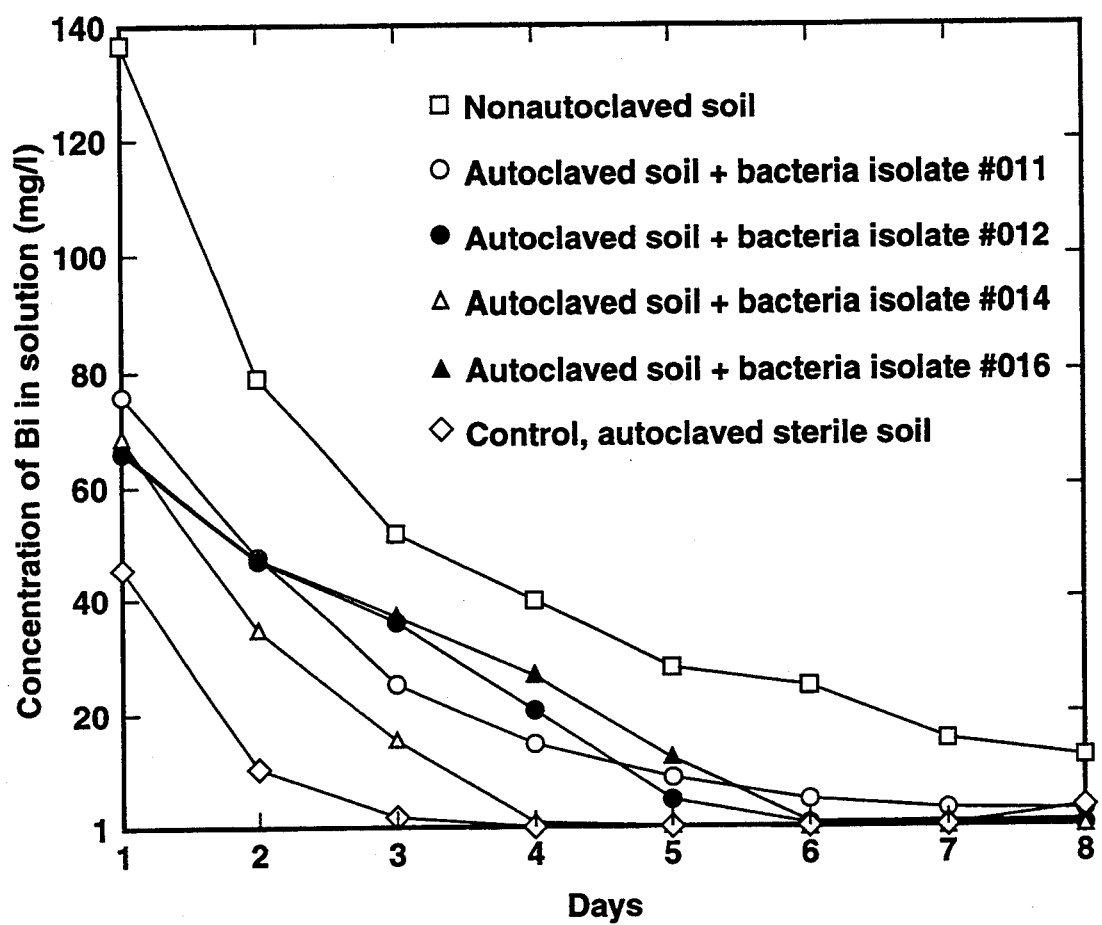
FIG. 1 is a graph showing the concentration of bismuth released from contaminated soil under various experimental conditions.

Applicants have conducted various experimental studies to determine the mobilization of several hazardous metal ions, such as bismuth (Bi), cadmium (Cd), lead (Pb), thorium (Th) and uranium ($UO_2$) as uranyl, from soils. The soil used was obtained from the Snake River Plain near the Radioactive Waste Management Complex facility at the Idaho National Engineering Laboratory near Arco, Id. The soil sample area has not been used for waste storage and represented soil native to the area.

The clay content of the soil ranged from 25–40% of the samples analyzed and contained 30–36% illite, 13–26% smectite, 6012% kaolinite, 0–26% carbonate and a cation exchange capacity exchange capacity between 11 and 27 milliequivalents per 100 grams of solid, The soil mixture content was 14% by weight at the time of sampling. Washed river sand was mixed with the soil in a 1:1 ratio by weight to facilitate percolation of water through the soil and metal solutions used to experimentally contaminate the soil. It was determined that the sand used in the experimental studies did not sorb any of the metals in significant amounts.

In the experimental studies, a 3.5 kg soil/sand mix was placed in a lucite column equipped with a drain on the bottom. Based on the metal sorption capacity of the soil/sand mix determined previously, 3.54 grams of Bi, 1.42 grams of Cd, 3.54 grams of Pb, 3.54 grams of Th, and 2.83 grams of U were added to the column in the form of nitrate salts in a total of 20 liters of H₂O. The flow rate was measured at 14 ml per minute. The column was allowed to stand for one week until effluence stopped. The resultant contaminated soil/sand was then mixed thoroughly in a stainless steel container.

Actual metal concentration in the experimentally contaminated soil was determined to establish a baseline. One hundred grams (wet weight) of the metal-amended soil/sand mix was dried to constant weight at 85° C. The dry mix was weighed and then mixed thoroughly. A 1 gram portion (in triplicate) was digested according to procedures described in EPA SW-846 Method 3050. The concentration of Bi, Cd, Pb, Th and U in the resultant sample was determined by inductively coupled plasma-atomic emission spectroscopy (ICP-AES). The following total amount of each metal in 100 grams (wet weight) of the metal soil/sand mix was then calculated: Bi (76 mg); Cd (27 mg); Pb (81 mg); Th (86 mg); and U (51 mg).

Five hundred milliliters of sterile 10 mM cysteine solution was mixed with 100 grams of the metal-amended soil in a 1 liter flask and tested under the following conditions: (a) nonautoclaved; (b) autoclaved sterile; and (c) autoclaved sterile inoculated with pure cultures of soil bacterial isolates. A 1 ml sample was transferred into a test tube containing 9 ml of sterile soy broth (TSB) (30 g/l) and mixed thoroughly. A 1 ml aliquot was then transferred into another 9 ml TSB and mixed. From this tube, 0.1 ml aliquot was dispensed into a sterile petri dish containing ~20 ml of sterile, solidified trypticase soy agar (TSA) (40 g/l) and spread over the entire surface of the agar plate with a sterile glass rod. The plate was incubated for 4 days at 22° C. (±3° C.). Bacterial colonies showing different morphologies on the agar plate were transferred individually to separate TSA plates and streaked over the surface of the agar with a sterile inoculating loop. The plates were subcultured onto tubes of solidified TSA with slanting surface. The inoculated agar slants were numbered #011, 012, 013, etc. and incubated at 22° C. (±3° C.) for 4 days and then kept at 4° C. for stock culture.

To inoculate autoclaved sterile soil with a pure culture isolated from the metal-amended soil, 250 ml of TSB was inoculated with a loopful of pure culture from the stock culture and incubated overnight at 22° C. (±3° C.) on a shaker table at 150 rpm. The cells were harvested by centrifugation at 10,000×g for 10 minutes. The supernatant was discarded and the pellet was resuspended in 250 ml of sterile phosphate buffer and again centrifugated at 10,000×g for 10 minutes. The supernatant was discarded and the pellet of bacterial cells was transferred to the autoclaved sterile soil.

To investigate the effect of the reducing/complexing agent cysteine on the release of metals and the microbial influence on the process, a metal-amended soil/sand sample was prewashed by filtering 2 liters of distilled water through a soil/sand column as previously described. The pre-washed soil/sand sample was then removed from the column and a 500 ml 10 mM sterile cysteine solution was mixed with 100 grams of the metal-amended solid/sand by stirrer motor at 150 rpm for 8 days and tested under the previously describe conditions. Viable microbes were enumerated daily by spread plating 0.1 ml of a series of diluted soil and cysteine mixture (i.e., 1/10, 1/100, 1/1000, etc.) on trypticase soy agar which was incubated for 4 days at 22° C. (±3° C.). Eh and pH of the soil/sand and cysteine mixture were measured daily. Eh measurements were accomplished by using a Pt/AtCl redox electrode and pH was measured with a standard pH electrode. A 6 ml aliquot of the cysteine solution was withdrawn after 30 minutes settling, centrifuged at 3000×g for 20 minutes and filtered through a 0.45 μm filter disk. Five milliliters of the filtrate was diluted to 25 ml with 1% HNO₃ for metal analysis by ICP-AES.

The following Table 1 shows the metal released from previously water-washed soil by 10 mM cysteine under the different experimental conditions.

TABLE 1

Metal released from previously water-washed soil by 10 mM cysteine under different experimental conditions.*

|  |  | Bi | Cd | Pb | U |
|---|---|---|---|---|---|
| Amount of metal (mg) in 100 g amended soil/sand mix |  | 76.00 | 27.00 | 81.00 | 51.00 |
| Control: autoclaved sterile soil | mg % | 23.25 | 0.70 | 4.25 | 14.43 |
|  |  | 30.60 | 2.60 | 5.20 | 28.30 |
| Nonautoclaved soil | mg % | 68.75 | 1.17 | 21.00 | 29.54 |
|  |  | 90.50 | 4.30 | 25.90 | 57.90 |
| Autoclaved soil + bacterial isolate #011 | mg % | 38.25 | 1.03 | 10.75 | 14.61 |
|  |  | 50.30 | 3.80 | 13.30 | 28.60 |
| Autoclaved soil + bacterial isolate #012 | mg % | 33.40 | 1.05 | 24.80 | 18.31 |
|  |  | 42.90 | 3.90 | 30.60 | 35.90 |
| Autoclaved soil + bacterial isolate #014 | mg % | 34.55 | 3.20 | 30.25 | 23.27 |
|  |  | 45.50 | 11.90 | 37.30 | 45.60 |
| Autoclaved soil + bacterial isolate #016 | mg % | 33.30 | 3.15 | 27.60 | 23.62 |
|  |  | 43.80 | 11.70 | 34.10 | 46.30 |

*500 ml of 10 mM cysteine solution was added to each soil type. Values represent the metal in solution on the day that showed the greatest release of metal over an 8-day period.

Figure 2:
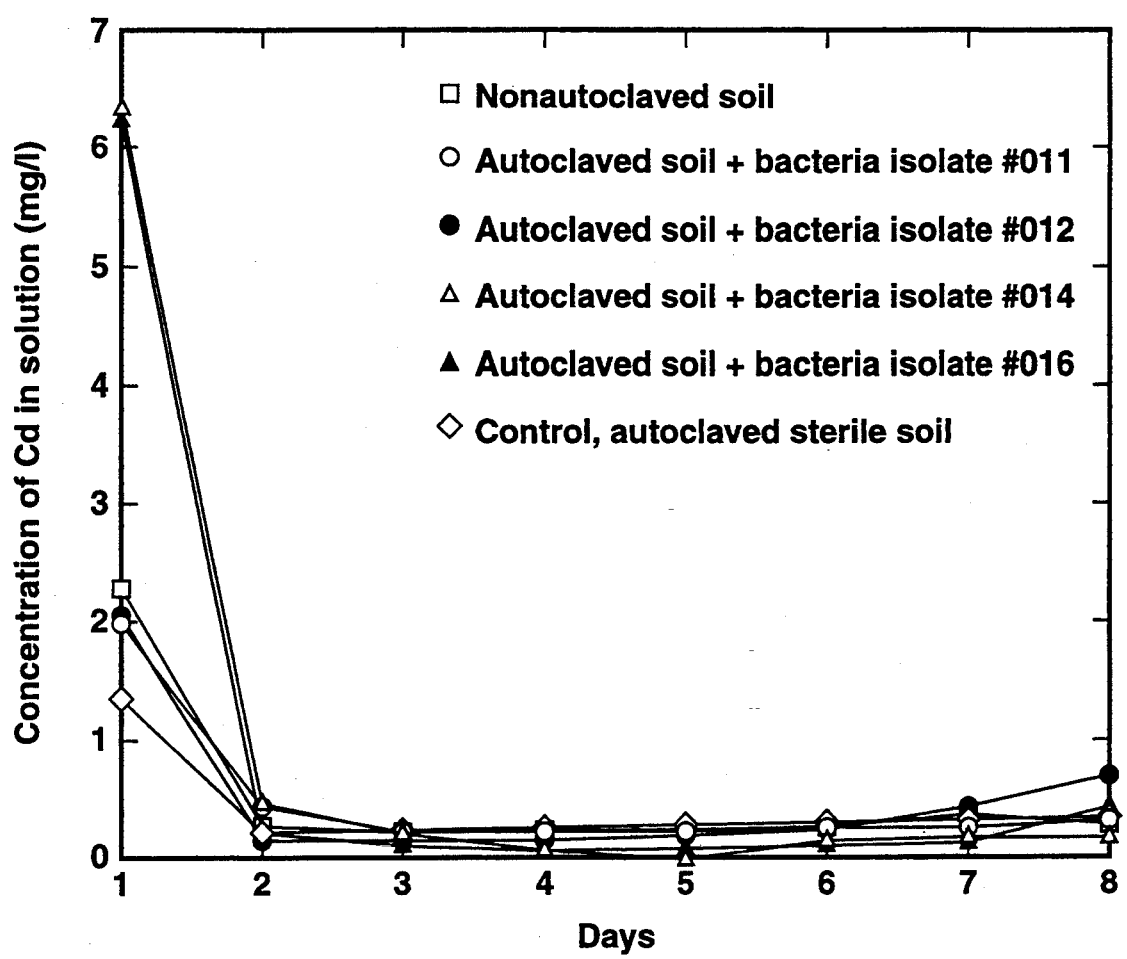
FIG. 2 is a graph showing the concentration of cadmium released from contaminated soil under various experimental conditions.
Figure 3:
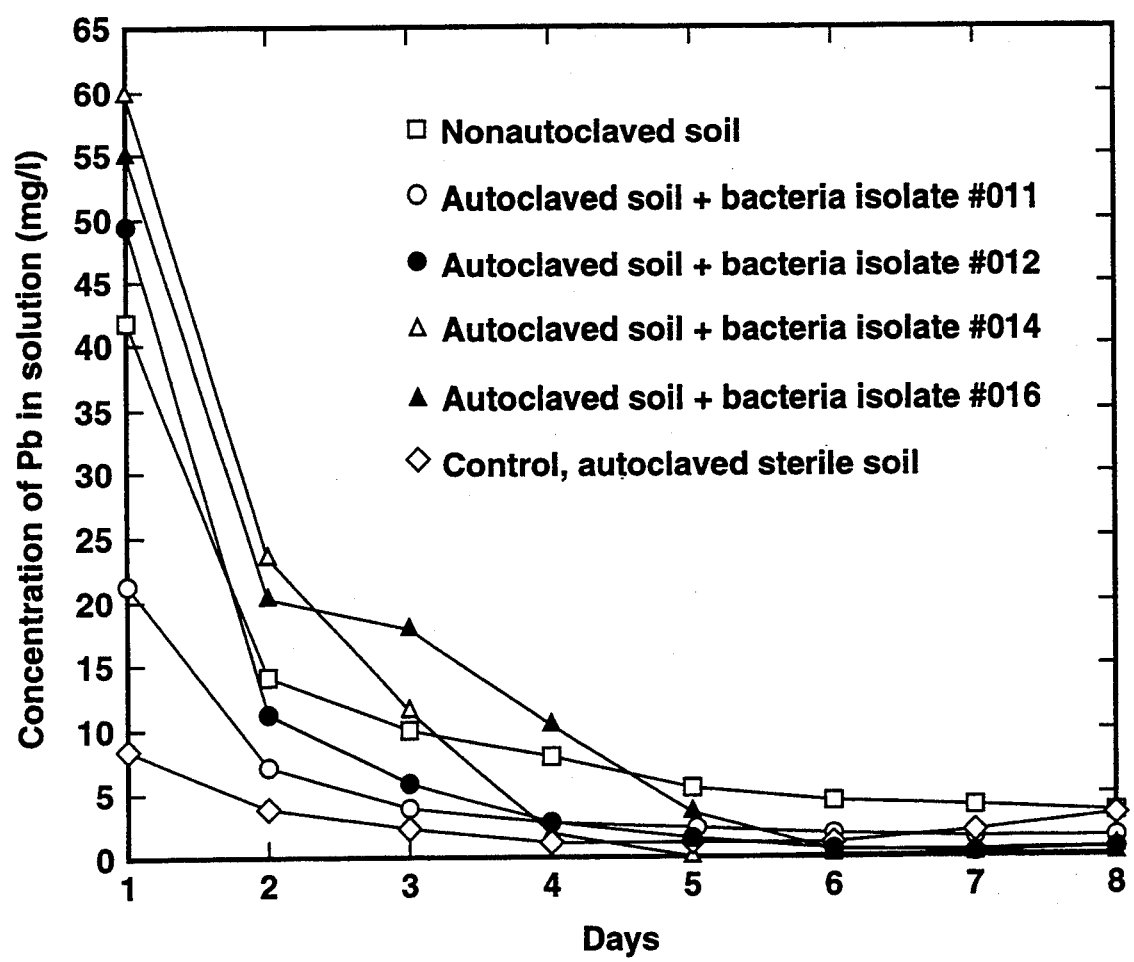
FIG. 3 is a graph showing the concentration of lead released from contaminated soil under various experimental conditions.
Figure 4:
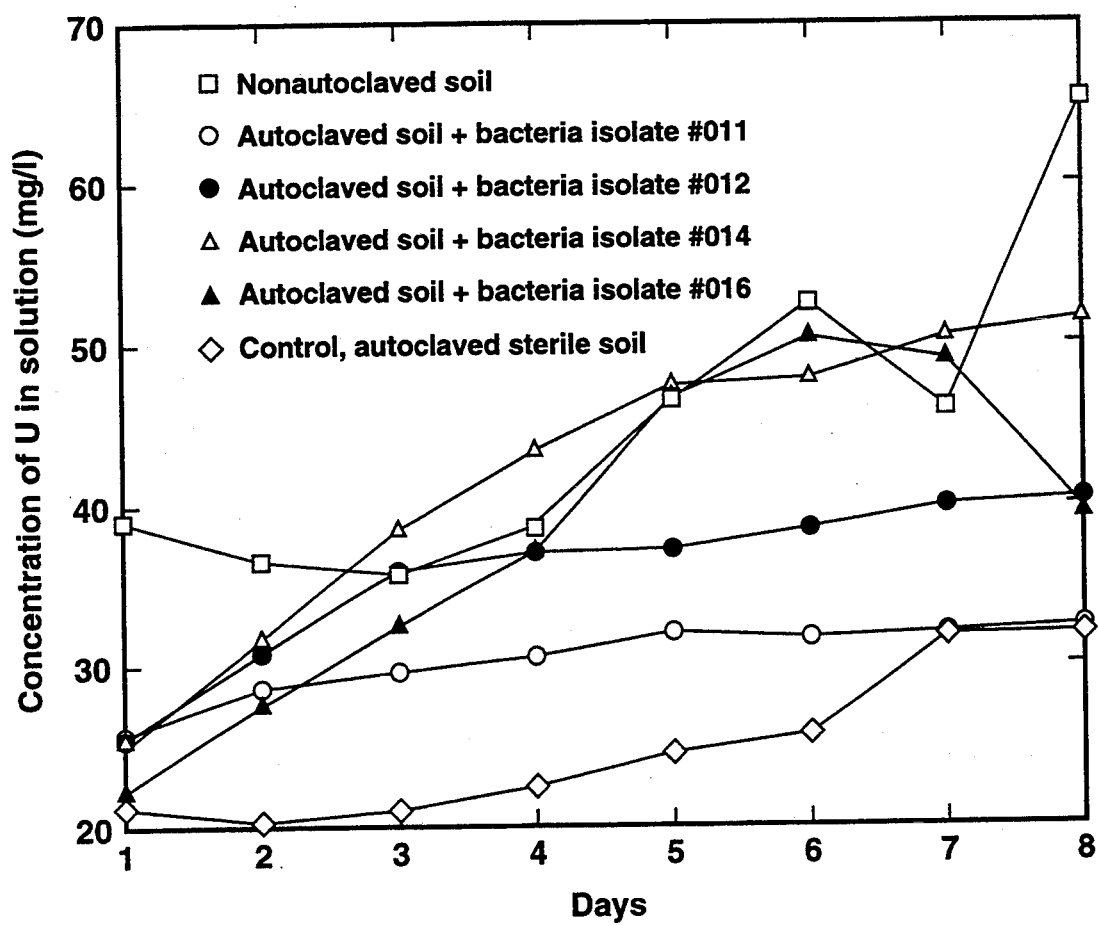
FIG. 4 is a graph showing the concentration of uranium released from contaminated soil under various experimental conditions.

As shown in FIG. 1, in experiments where cysteine was used, the largest amount of Bi (137.5 mg/l) was released from nonautoclaved soil in the presence of 10 mM cysteine solution. The autoclaved/sterile soil only had 46.5 mg/l of Bi released. However, when the autoclaved soil was reinoculated with pure cultures of bacteria, the amount of Bi released was generally increased over that observed in the autoclaved sterile soil. In all cases, the maximum amount of Bi released occurred within one day. Some of the metal was reabsorbed by the soil as time progressed. As shown in FIGS. 2 and 3 respectively, the release of Cd and Pb exhibited a similar pattern as Bi. However, certain pure cultures demonstrated higher efficacy in release of Cd and Pb than nonautoclaved soil. As can be seen in FIG. 4, the amount of U released showed a different trend from Bi, Cd, and PB. The amount of U release increased gradually with time.

Applicants noted that pH levels fluctuated during the experimental studies but any general relationship between pH and metals released was inconclusive. Similarly, changes in the redox potential in the presence of cysteine did not appear to relate to the metal release patterns. However, there was a general trend toward oxidation over the 8-day period. Since the greatest release of most metals occurred in the first 24 hours, it is believed that low potential has a beneficial effect on the release of the metals into solution, with the exception of uranium.

Figure 5:
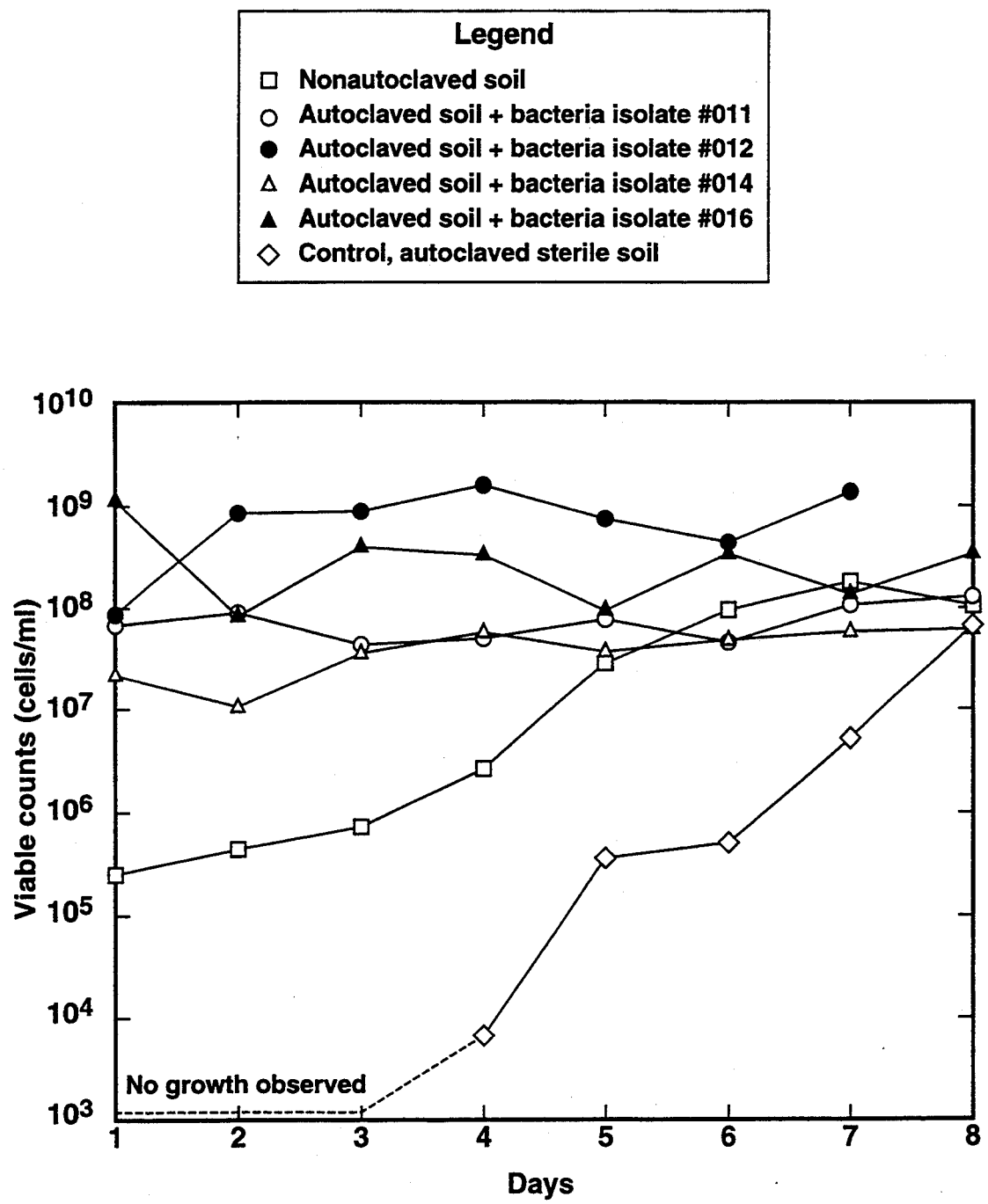
FIG. 5 is a graph showing the viable bacteria counts of the soil/cysteine mixture under different experimental conditions.

Microorganisms in nonautoclaved soil increased from $2.69 \times 10^5$ on day 1 to $1.1 \times 10^8$ colony forming units (CFU)/ml on day 8, while the autoclave sterile soil remained sterile through day 3. After three days a gradual increase in population occurred to $5.5 \times 10^7$ CFU/ml on day 8 due to contamination. Sterility of the soil was confirmed by plating (in triplicate) 0.1 ml of the soil and cysteine mixture on TSA plates and incubated for 4 days at 22° C. (±3° C.). The microbial population in autoclaved soil that was reinoculated with pure cultures did not show significant changes in bacteria numbers during the 8-day period (see FIG. 5) indicating the total microflora population is not necessarily directly proportional to the amount of metals released from the soil. It is apparent that there is a threshold value for the microbial population and that further increase in the size of the microbial population does not increase the amount of metals released.

Applicant conducted additional experimental studies using the reducing agent sodium thioglycollate. One hundred grams of nonautoclaved metal-amended soils was placed in 500 ml of sodium thioglycollate medium (29.8 g/L, Difco Laboratory, Detroit, Mich.) which contained bacterial nutrients such as casitone, yeast extract, dextrose, sodium chloride and L-cystine in additions to 0.05% sodium thioglycollate. To ensure the autoclaving process did not change the chemistry and texture of the soil to cause permanent binding of metal ions to the soil particles, a similar study using thioglycollate broth and sterile soil reinoculated with bacteria was performed. Table 2 summarizes the results of the sodium thioglycollate studies.

TABLE 2

Metal released from previously water-washed nonautoclaved soil and autoclaved sterile soil reinoculated with microorganisms in the presence of thioglycollate medium.

| | | Bi | Cd | Pb | Th | U |
|---|---|---|---|---|---|---|
| Amount of metal (mg) in 100 g of soil/sand mix | | 76.00 | 27.00 | 81.00 | 86.00 | 51.00 |
| Nonautoclaved soil | mg % | 28.00 | 10.00 | 9.40 | 15.10 | 18.68 |
| | | 36.84 | 37.04 | 11.60 | 17.56 | 36.63 |
| Reinoculated soil | mg | 32.25 | 4.52 | 10.35 | 9.40 | 14.93 |

As can be seen by comparing Table 1 and Table 2, the thioglycollate medium removed lesser amounts of Bi, Pb, and U than the 10 mM cysteine solution, but was able to remove significantly larger amounts of Cd and Th from the soil. Autoclaved soil that was reinoculated with microbes showed comparable results to the nonautoclaved counterpart in release of metals in the thioglycollate medium, indicating that autoclaving did not cause the permanent binding of Bi, Cd, Pb, Th, and U ions to soil particles.

Applicants also studied the effect of glycine, an amino acid known to complex certain metals, on the release of metals from metal-amended soil. Experimental procedures were similar to that for cysteine extracting, except 10 mM of glycine was substituted for cysteine and only autoclaved and nonautoclaved soil with indigenous microorganisms were used. As can be seen in the following Table 3, the release of uranyl ions using glycine was enhanced by the microbial activity in the nonautoclaved study (20.75 mg) since a substantial smaller amount of uranyl ions (2.62 mg) was released in the autoclaved soil.

TABLE 3

Metal released from previously water-washed nonautoclaved and autoclaved soil by 10 mM glycine

| | | Bi | Cd | Pb | Th | U |
|---|---|---|---|---|---|---|
| Amount of metal (mg) in 100 g of soil/sand mix | | 76.00 | 27.00 | 81.00 | 86.00 | 51.00 |
| Nonautoclaved soil | mg % | 0.07 | 0.43 | 0.18 | 0.57 | 20.75 |
| | | 0.09 | 1.60 | 0.22 | 0.66 | 40.60 |
| Autoclaved soil | mg % | 0.03 | 0.41 | 0.05 | 0.03 | 2.62 |
| | | 0.04 | 1.52 | 0.06 | 0.03 | 5.14 |

The values shown in Table 3 represent the metal in solution on the day that showed the greatest release of metal over the 8-day period after the addition of 500 ml of 10 mM glycine solution. Redox potentials measured during the 8-day period fluctuated between 76 mV and 167 mV for nonautoclaved soil, and between 137 mV and 148 mV for autoclaved soil; while pH fluctuated between 6.76 and 8.14 for nonautoclaved soil and between 8.38 and 8.50 for autoclaved soil. Viable bacterial counts indicated that the sterile soil remained sterile through day 6 and increased to $1.08 \times 10^4$ by day 8, whereas the nonautoclaved soil maintained a relatively stable population ($8.50 \times 10^8$ CFU/ml to $1.45 \times 10^9$ CFU/ml) throughout the study.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A method for removing heavy metals bound to solid particles, the steps comprising: providing an aqueous solution comprised of reducing agent material, contacting the solution with the solid particles, said solid particles containing indigenous microorganisms, for a time period effective to mobilize the metals from the solid particles, and separating the mobilized metals from the solid particles.

2. The method of claim 1 wherein the solid particles are soil.

3. The method of claim 1 wherein the indigenous microorganisms are bacteria.

4. The method of claim 1 wherein the metals are bismuth, cadmium, lead, thorium or uranium.

5. The method of claim 1 wherein the metals are transuranic metals.

6. The method of claim 1 wherein the reducing agent material is cysteine.

7. The method of claim 1 wherein the reducing agent material is sodium thioglycollate.

8. The method of claim 7 wherein the sodium thioglycollate is in a medium containing bacterial nutrients.

9. A method for removing heavy metals bound to solid particles, the steps comprising: providing an aqueous solution comprised of reducing agent material, inoculating the solid particles with microorganisms isolated from the solid particles, contacting the solution with the inoculated solid particles for a time period effective to mobilize the metals from the solid particles, and separating the mobilized metals from the solid particles.

10. The method of claim 9 wherein the solid particles are soil.

11. The method of claim 9 wherein the isolated microorganisms are bacteria.

12. The method of claim 9 wherein the metals are bismuth, cadmium, lead, thorium or uranium.

13. The method of claim 9 wherein the metals are transuranic metals.

14. The method of claim 9 wherein the reducing agent material is cysteine.

15. The method of claim 9 wherein the reducing agent material is sodium thioglycollate.

16. The method of claim 15 wherein the sodium thioglycollate is in a medium containing bacterial nutrients.

17. A method for removing heavy metals bound to solid particles, the steps comprising: providing an aqueous solution comprised of complexing agent material, contacting the solution with the solid particles, said solid particles containing indigenous microorganisms, for a time period effective to mobilize the metals from the solid particles, and separating the mobilized metals from the solid particles.

18. The method of claim 17 wherein the complexing agent is the amino acid glycine.

19. The method of claim 17 wherein the solid particles are soil.

20. The method of claim 17 wherein the metals are bismuth, cadmium, lead, thorium or uranium.

21. The method of claim 17 wherein the metals are transuranic metals.

* * * * *